United States Patent [19]
Betto

[11] Patent Number: 5,531,041
[45] Date of Patent: Jul. 2, 1996

[54] GUIDING DEVICE FOR FISHING-ROD LINES

[75] Inventor: Massimo Betto, Pernumia, Italy

[73] Assignee: Alutecnos S.r.l., Monselice, Italy

[21] Appl. No.: 310,293

[22] Filed: Sep. 22, 1994

[30] Foreign Application Priority Data

Sep. 29, 1993 [IT] Italy ................ PD93A0194

[51] Int. Cl.[6] ........................... A01K 87/04
[52] U.S. Cl. ........................... 43/24
[58] Field of Search ........................... 43/24

[56] References Cited

U.S. PATENT DOCUMENTS

| | | | |
|---|---|---|---|
| 801,884 | 10/1905 | Kunze et al. | 43/24 |
| 1,835,310 | 12/1931 | Kline | 43/24 |
| 2,226,295 | 12/1940 | Lee | 43/24 |
| 2,231,053 | 2/1941 | Byrd | 43/24 |
| 2,262,300 | 11/1941 | Reynolds | 43/24 |
| 2,525,948 | 10/1950 | Ruiz | 43/24 |
| 2,878,608 | 3/1959 | O'Brien | 43/24 |
| 3,222,812 | 12/1965 | Gorham | 43/24 |
| 3,315,400 | 4/1967 | Axelson | 43/24 |
| 3,350,809 | 11/1967 | Chion | 43/24 |
| 3,581,427 | 6/1971 | Reinerton | 43/24 |
| 3,641,696 | 2/1972 | Fleischer | 43/24 |
| 4,428,141 | 1/1984 | Kovalovsky | 43/24 |
| 4,807,385 | 2/1989 | Morishita | 43/24 |
| 5,276,991 | 1/1994 | Stotesbury | 43/24 |

FOREIGN PATENT DOCUMENTS 1542260  3/1979  United Kingdom ............ 43/24

Primary Examiner—Kurt Rowan
Attorney, Agent, or Firm—Guido Modiano; Albert Josif

[57] ABSTRACT

A guiding device for fishing-rod lines includes a body that forms two parallel wings between which at least one guiding roller and at least one pin are rigidly coupled; the pin and the roller form, together with the wings, at least one passage for the line of the rod. The device body is formed by parts that are detachably fixed to each other and are shaped so as to retain between them a support to be fixed to the rod.

5 Claims, 2 Drawing Sheets

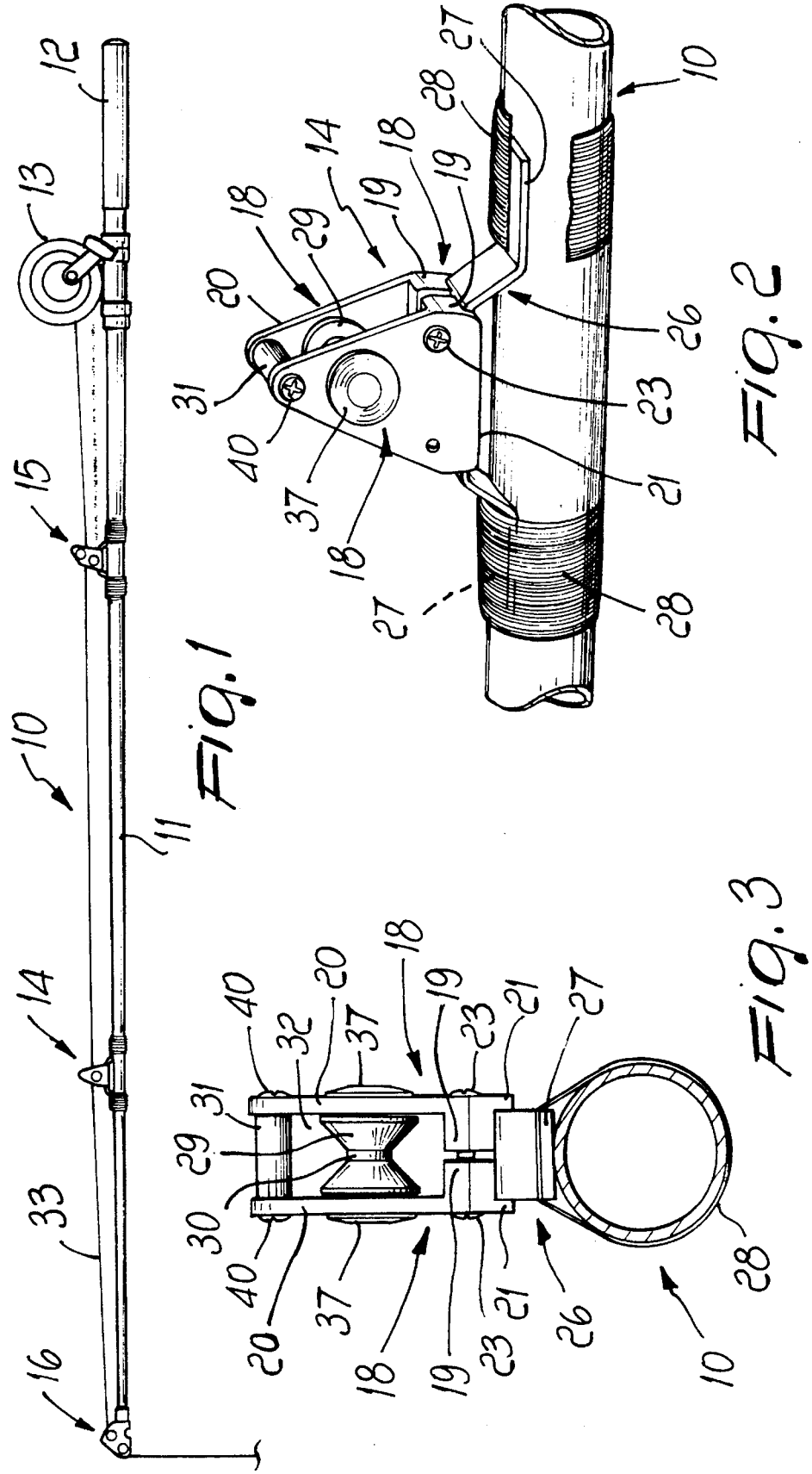

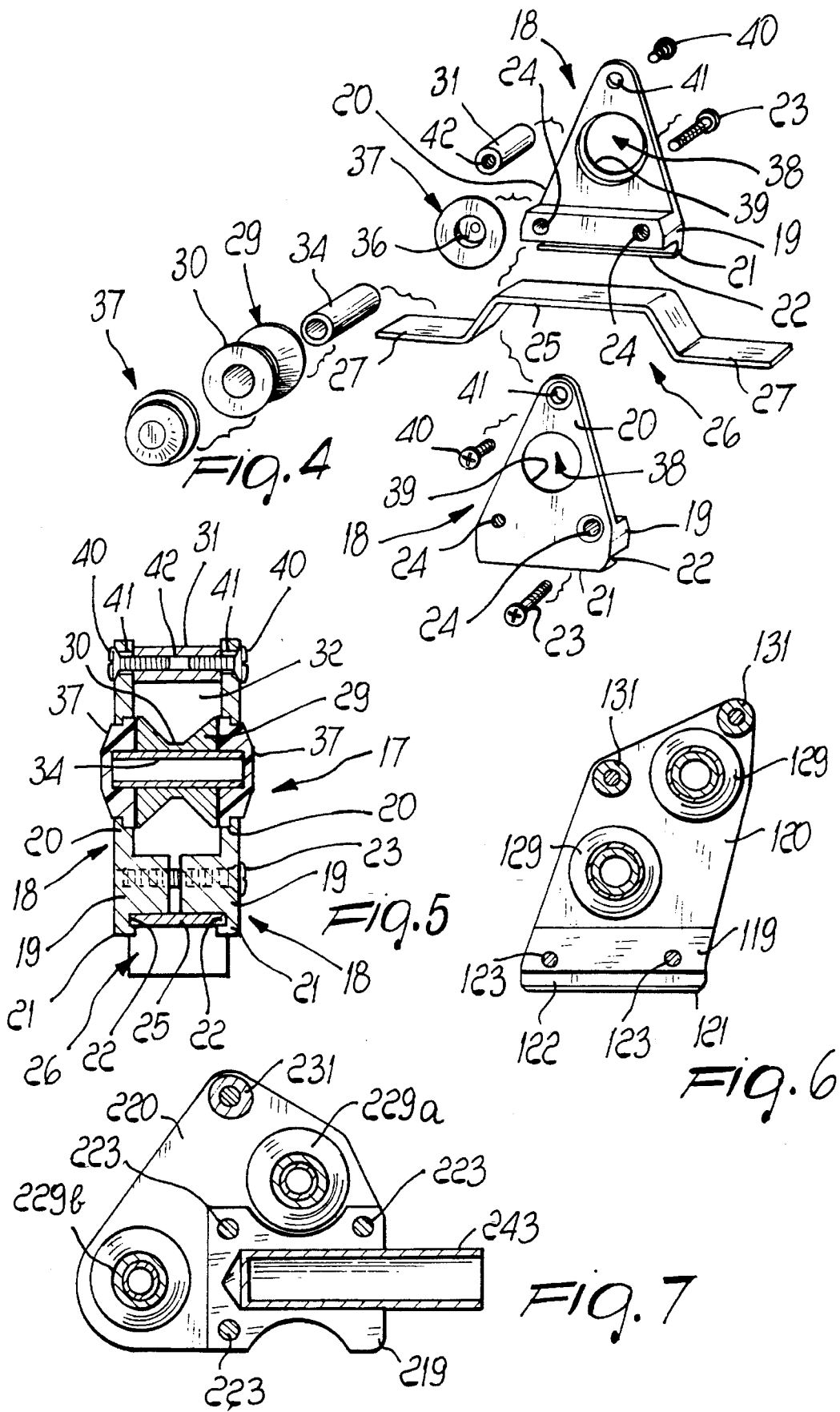

5,531,041

GUIDING DEVICE FOR FISHING-ROD LINES

BACKGROUND OF THE INVENTION

The present invention relates to a guiding device for fishing-rod lines.

For fishing rods, particularly of the type used for deep-sea fishing, guiding devices are applied to guide the line unwound from the reel along the rod; each guiding device comprises a body which monolithically forms two parallel wings between which one or two guiding rollers and one or more pivots are rigidly mounted so as to form, together with said wings, passage openings for the line.

Aligned supporting feet are also monolithically integrated in said body and are stably fixed to the rod.

Fixing occurs by resting the feet on the rod longitudinally, winding multiple turns of line on the assembly, and spreading a layer of hardening resin onto the turns.

The entire body, including the feet monolithically associated therewith, is made of metal and is produced either by blanking and bending a metal plate or by other methods.

Although they are currently in widespread use in the field, devices of the described type are not free from drawbacks, the most important being due to the fact that the body is rigidly coupled to the feet.

This forces to disassemble the entire device from the rod in case of breakage.

This entails cutting the resin-embedded turns of line that wrap around the feet to disengage them from the rod and, after replacement, reconstructing the winding and the resin coating.

This last operation is rather complicated and certainly cannot be performed by the user.

Another constructive characteristic of known guiding devices resides in the fact that disk-like inserts, made of plastic material, are interposed between the metal rollers and the wings supporting them; said inserts are suitable to prevent contact between metals, which in the specific case causes the formation of small voltaic pile-like structures, and consequently of unpleasant electricity, favored by the salinity of the operating environment.

Constructively, each roller is arranged between two plastic inserts; each insert externally abuts against a corresponding seat of the respective wing and the assembly is crossed by a pin and kept together by screws that engage corresponding holes of the pin and abut against the inserts with their heads.

This constructive layout has a considerable drawback which is due to the fact that repeated use may induce rotational torques on the screws, loosening them and sometimes causing their disengagement.

This of course leads to the breakage of the device.

SUMMARY OF THE INVENTION

A principal aim of the present invention is to provide a guiding device for fishing-rod lines that eliminates the drawbacks described above in the known art.

A consequent primary object is to provide a device that can be assembled and disassembled for repairs or replacements rapidly and easily even by the user.

Another important object is to provide a device that is structurally simple and reliable from the point of view of operation.

With this aim, these objects and others in view, there is provided, according to the invention, a guiding device for fishing-rod lines, of the type comprising a body that forms two parallel wings between which at least one guiding roller and at least one pin are rigidly coupled, said pin and said roller forming, together with said wings, at least one passage for the line of a fishing rod, said device being characterized in that said body includes parts that are detachably fixed to each other and are shaped so as to retain between them a support to be fixed to the rod.

DESCRIPTION OF THE PREFERRED EMBODIMENTS

Further characteristics and advantages of the invention will become apparent from the following detailed description of some embodiments thereof, illustrated only by way of non-limitative example in the accompanying drawings, wherein:

FIG. 1 is a view of a deep-sea fishing rod on which devices, according to three different embodiments of the invention, are installed;

FIG. 2 is an enlarged-scale perspective view of the guiding device in a first configuration, associated with the rod;

FIG. 3 is a front view of the device of FIG. 2, associated with the rod;

FIG. 4 is an exploded view of the device of FIG. 2;

FIG. 5 is a transverse sectional view of the device of FIG. 2;

FIG. 6 is a longitudinal sectional view of the guiding device in a second configuration;

FIG. 7 is a longitudinal sectional view of the guiding device in a third configuration.

DESCRIPTION OF THE PREFERRED EMBODIMENTS

With reference to the above FIG. 1, a fishing rod, for example for deep-sea fishing, is generally designated by the reference numeral 10; a handgrip 12, a reel 13, and multiple guiding devices according to the invention are mounted on said rod, and said guiding devices assume various configurations according to the position in which they are fitted on the rod.

A first type of guiding device, suitable for an intermediate position, is generally designated by the reference numeral 14; a second type, suitable for a position adjacent to the reel 13, is designated by the reference numeral 15; and a third type, to be installed on the tip of the rod, is designated by the reference numeral 16.

With reference to the above FIGS. 2 to 5, the guiding device 14 comprises a body 17 which is formed by two facing symmetrical elements 18 that are arranged mirror-symmetrically; each element forms a block 19 that is shaped substantially like a parallelepiped, a wing 20 extending upwards from said block, and a lower edge 21 in the inner part whereof there is a longitudinal channel 22.

The two parts of the body 17 are joined, without mating, by means of screws 23 that engage suitable holes 24 of the elements 18 that pass through the regions of the blocks 19.

Said holes 24 are alternately of the through type and of the threaded type.

According to the invention, the channels 22 form together the seat wherein a complementarily shaped flat portion 25 is enclosed due to the tightening of the screws 23, like the jaws of a vice, so that said portion rests against the blocks 19 in an upward direction; said flat portion 25 belongs to a laminar support 26 extending at the ends of said flat portion with aligned feet 27 to be fixed, by means of resin-coated longitudinally arranged turns of line 28, to the rod 10.

The feet 27 are parallel to the flat portion 25 due to the bending of the lamina from which the support 26 is obtained.

A roller 29 is rotatably retained between the wings 20 and has a guiding race 30; a pin 31 is provided above said roller and forms, together with it, a passage 32 for the line 33 of the rod 10.

More particularly, the axial dimension of the roller 29 is slightly smaller than the internal distance between the wings 20, and said roller can rotate about a solid or hollow pivot 34 made of sintered metallic material (self-lubricating bronze) which is longer than said distance between the wings.

The ends of the pivot 34 are inserted in corresponding dead holes 36 and abut against them; said holes belong to disk-like domes 37, made of self-lubricating plastic material, which act as bearings, are inserted from the inside in corresponding seats 38 of the wings 20, and internally abut against suitable edges 39 thereof; the edges of said domes are shaped complementarily to said edges 39.

The pin 31 is instead arranged like a spacer between the upper parts of the wings 20 and is fixed thereto by means of screws 40 that pass through the wings 20 in corresponding through holes 41 and engage a corresponding threaded hole 42 passing axially through said pin.

With reference now to the above FIG. 6, the guiding device 15, which is of the same constructive type as the device 14, has two rollers 129 and two pins 131 between wings 120; said rollers are arranged internally, and said pins are located in end regions.

The rollers 129 and the pins 131 are of course assembled and fixed by virtue of the same elements as the roller 29 and the pin 31 mentioned earlier.

The presence of two rollers 129 is due to the fact that in the region adjacent to the reel the line tends to oscillate and it must therefore be possible to guide it by rolling friction both in an upward region, when the spool of line is full, and in a downward region, when the spool of line is empty.

In this case, too, each wing 120 extends from a block 119 which supports, in a downward region, an edge 121 with a channel 122 for a support that is identical to the support 26 and is not shown in FIG. 6.

Assembly occurs by virtue of screws 123 which engage the blocks 119.

With reference to the above FIG. 7, in the guiding device 16 the two blocks, now designated by the reference numeral 219, form between them a longitudinal dead hole for the insertion of a tubular cap 243 in which it is possible to conveniently insert the tip of the rod 10.

In this case, too, two rollers 229a and 229b and a pin 231 are provided between the wings 220; said rollers and said pin are constructively identical to the preceding ones.

In this case, too, transverse screws 223 are provided for fixing the blocks 219.

The line passes between the pin 231 and a roller 229/A which discharges most of the work load onto the top side of the rod, whereas the second roller 229/B is arranged in an end region, since it must constitute an element for the angular guiding of the line.

From what has been described above, it is evident that the guiding device, in all three configurations 14, 15 and 16, allows to disassemble and disengage the body supporting the guiding rollers from the supports such as 26 or 243.

This allows the user to perform maintenance operations or replacements in case of breakage without having to disassemble the supports from the rod.

The rollers 29, 129 and 229 are furthermore rigidly coupled to the respective wings without the aid of screws or other device which may loosen during use.

It should be noted that none of the means that join the elements constituting the bodies acts directly on the corresponding support for fixing to the rod.

In practice it has been observed that the intended aim and object of the present invention have been achieved.

The invention thus conceived is susceptible of numerous modifications and variations, all of which are within the scope of the inventive concept.

All the details may furthermore be replaced with other technically equivalent elements.

In practice, the materials employed, so long as they are compatible with the contingent use, as well as the dimensions, may be any according to the requirements.

What is claimed is:

1. A guiding device for fishing-rod lines, comprising:

a body which is formed by two facing symmetrical elements, each element forming a block; two parallel wings extending upwards from said block; clamping screw means being provided throughout said blocks for imparting to said blocks a clamping movement;

at least one guiding roller rigidly coupled between the said two symmetrical elements;

at least one pin also rigidly coupled between the said two symmetrical elements, forming together with said roller a passage for a line of a fishing rod;

at least two disk-like domes, acting as bearings for said guiding roller;

at least one pivot to allow said guiding roller to rotate about;

a one piece plate-like support having a central flat shaped portion being adapted to be fixed to the fishing rod and detachably secured to said body;

said blocks defining each a channel to form a seat in which said central flat portion is accommodated and clamped.

2. A guiding device for fishing-rod lines according to claim 1, wherein said facing elements comprises holes which are alternately of the through type and of the threaded type, in which said clamping screw means have to be engaged.

3. A guiding device for fishing-rod lines according to claim 1, wherein said plate-like support protrudes from said seat and extends at the ends of said flat portion with aligned feet to be fixed to said rod.

4. A guiding device according to claim 1, wherein said wings define each a respective hole, in which said disk-like domes are engaged, said domes defining dead holes for housing the ends of said pivot.

5. A guiding device according to claim 4, wherein said disk-like domes act as bearings and are inserted from inside in said hole of said wings and internally abut with dome edges against complementary edges of said wings.

* * * * *